United States Patent [19]
McMaster et al.

[11] Patent Number: 4,909,819
[45] Date of Patent: Mar. 20, 1990

[54] METHOD FOR BENDING GLASS SHEETS

[75] Inventors: Harold A. McMaster, Woodville; Norman C. Nitschke, Perrysburg; Dexter H. McMaster, Perrysburg; Ronald A. McMaster, Perrysburg; Thomas E. Feehan, Toledo, all of Ohio

[73] Assignee: Glasstech, Inc., Perrysburg, Ohio

[21] Appl. No.: 367,954

[22] Filed: Jun. 19, 1989

Related U.S. Application Data

[63] Continuation-in-part of Ser. No. 249,718, Sep. 27, 1988, which is a continuation of Ser. No. 83,675, Aug. 7, 1987, Pat. No. 4,822,398.

[51] Int. Cl.$^4$ .............. C03B 23/03; C03B 27/00
[52] U.S. Cl. ........................................ 65/104; 65/106; 65/273; 65/291
[58] Field of Search .............. 65/104, 106, 273, 291

[56] References Cited

U.S. PATENT DOCUMENTS

| 4,111,676 | 9/1978 | Mechling et al. | 65/104 X |
| 4,376,643 | 3/1983 | Kahle | 65/273 X |
| 4,483,703 | 11/1984 | Keller et al. | 65/106 X |
| 4,822,398 | 4/1989 | McMaster et al. | 65/104 X |

Primary Examiner—Arthur Kellogg
Attorney, Agent, or Firm—Brooks & Kushman

[57] ABSTRACT

A method for bending glass sheets is disclosed in which a heated glass sheet (12) is introduced between spaced upper and lower bending platens (16,18). Heat source (19), integral with platen (18), is operable for applying heat in close proximity to the glass sheet (12) between the platens (16,18) to maintain an optimal bending temperature and the glass sheet (12) is bent such that a specific geometric orientation of the bend on the glass sheet (12) is controllable and repeatedly reproducible during a production operation.

11 Claims, 4 Drawing Sheets

METHOD FOR BENDING GLASS SHEETS

CROSS-REFERENCE TO RELATED APPLICATION

This application is a continuation-in-part of application Ser. No. 249,718 filed Sept. 27, 1988, which is a continuation of application Ser. No. 083,675 filed Aug. 7, 1987, now U.S. Pat. No. 4,822,398 both of which are hereby incorporated by reference.

TECHNICAL FIELD

This invention relates to a method for bending and tempering glass sheets.

BACKGROUND ART

In the copending applications relating to bending and quenching heated glass sheets, apparatus for bending and quenching heated glass sheets is disclosed. A pair of spaced opposed platens are provided for controlled bending of a heated glass sheet and subsequent quenching to impart desirable mechanical characteristics in the glass sheet.

As with conventional glass sheet benders, during the operation of the bending and quenching apparatus, premature cooling of the heated glass sheet prior to bending results in a partial tempering and hardening of the glass sheet which, in turn, can cause the glass sheet to break during bending. Also, relative movement between the upper and lower platens during the bending affect the specific geometric orientation of the bend on the glass sheet. Thereby if such movement does occur, the bend in the glass sheet may be incorrectly positioned thereon.

DISCLOSURE OF INVENTION

An object of the present invention is to provide a method for bending and tempering glass sheets at one station wherein an optimal bending temperature is maintained during the bending. Another object of the invention is to provide a method wherein the optimal bending temperature is automatically controlled.

A further object of the invention is to provide a method wherein the specific geometric orientation of the bend on the glass sheet is controllable and repeatedly reproducible during a production operation.

In carrying out the above objects and other objects of the invention, the method for bending and tempering glass sheets comprises indexing a heated glass sheet between spaced upper and lower bending platens of a glass bending and tempering apparatus. The upper platen is brought into a uniformly spaced relationship with the lower platen with the heated glass sheet therebetween and the upper platen is allowed to move with the lower platen during the bending.

Heat is applied in close proximity to the heated glass sheet between the platens to maintain an optimal bending temperature. The lower platen is controllably deformed to form the desired bent shape in the glass sheet. The heat applied by the platens is terminated after the bending or when the glass temperature reaches the upper limit of the optimal bending temperature.

The bent glass sheet is quenched by applying quenching gas through quench openings in the upper and lower platens in close proximity to both sides of the bent glass sheet to temper the bent glass sheet between the platens. The platens are separated to disengage the upper platen from the lower platen and the bent glass sheet is indexed out of the apparatus.

Preferably, the lower platen is deformed by raising or lowering portions of the lower platen. Most preferably, the deformation of the lower platen is accomplished via programmed bending steps. The programmed bending steps create a substantially uniform bending rate throughout the glass sheet.

The temperature of the heated glass sheet in the apparatus is sensed as the glass sheet exits an associated glass sheet heating furnace. Alternatively, the temperature of the glass sheet is continually sensed during the bending. An insufficiently heated glass sheet is exited from the apparatus and the bending process aborted prior to bending. The heat applied to the glass sheet is regulated to maintain the optimal bending temperature.

Quench air is actuated after the bending to quench the bent glass sheet. After the quenching the application of quench air is terminated. The bent and quenched glass sheet is exited from the apparatus.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
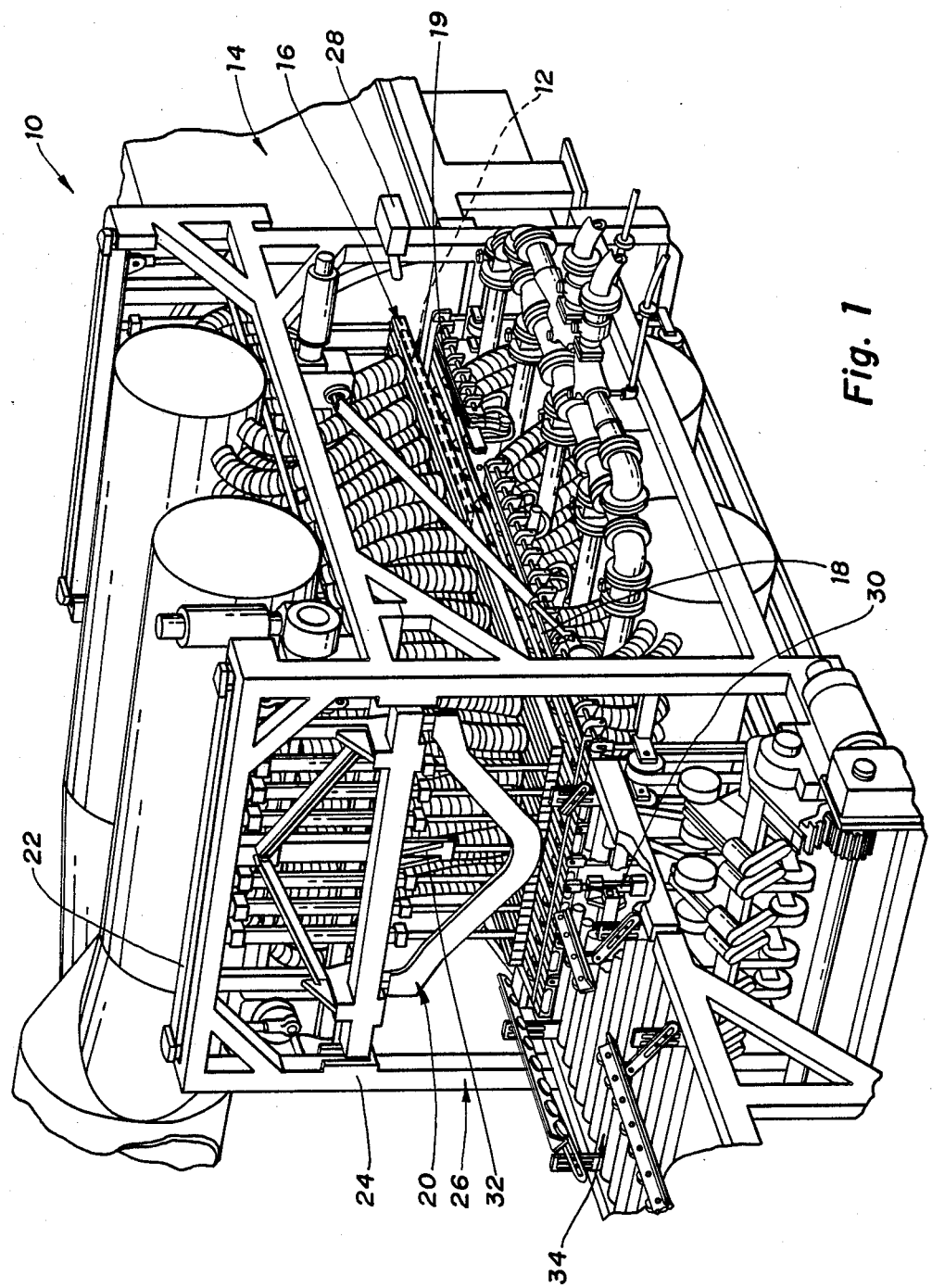
FIG. 1 is a perspective view of a glass bending, heating and tempering apparatus suitable for performing bending and quenching of heated glass sheets in accordance with the present invention and illustrating opposed lower and upper platens, in a spaced relationship, respectively mounted thereon lower and upper frame members thereby the apparatus being accessible for indexing a heated glass sheet between the platens.

Referring to drawing FIGS. 1 through 7, a method for bending and tempering glass sheets in accordance with the present invention is illustrated in consecutive drawing figures. As is hereinafter more fully described, the method for bending and tempering is performed on a glass bending, heating and tempering apparatus, generally indicated by reference numeral 10 or similar suitable apparatus. Such a method provides maintaining an optimal bending temperature and bending with specific geometric orientation of the bend on the glass sheet during a production operation.

As shown in FIG. 1 of the drawings, a heated glass sheet 12 heated in a glass heating furnace 14 is introduced between upper and lower bending platens 16,18 for subsequent bending. As illustrated, the lower bending platen 16 is in a planar configuration and thereby accessible. The upper bending platen 16 is retained in a planar position above the lower platen 18. Also, an upper frame member 22, which is vertically movable in relation to a lower frame member 24 which mounts the lower platen 18, is in a spaced apart relationship with the lower frame member to facilitate the indexing.

Figure 2:
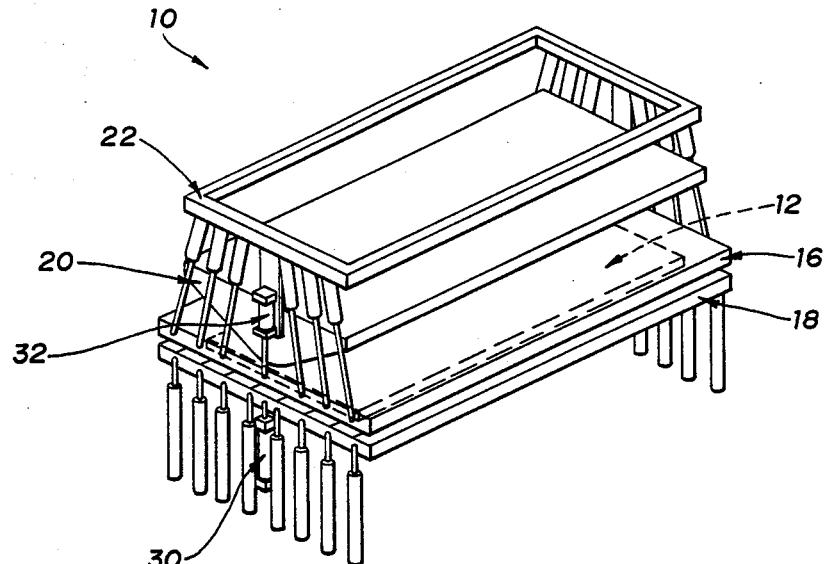
FIG. 2 is a perspective view of the apparatus illustrating the upper platen and lower platen with the glass sheet therebetween prior to bending.

As illustrated by FIG. 2 of the drawings, the upper frame member 22 is vertically displaced toward lower frame member 24 and the upper platen 16 is brought into contact with the lower platen 18 with the heated glass sheet 12 therebetween to initiate the bending.

In the preferred embodiment of the invention, the temperature of the heated glass sheet 12 is sensed by a sensor 28 to determine whether or not additional heat should be applied to the glass sheet to maintain an optimal bending temperature. If sensor 28 indicates that additional heat is required to inhibit the cooling of the glass sheet 12, heat is then applied via heat source 19, shown in FIG. 1, in close proximity to the heated glass sheet between the platens 16,18 to maintain the optimal bending temperature.

Figure 3:
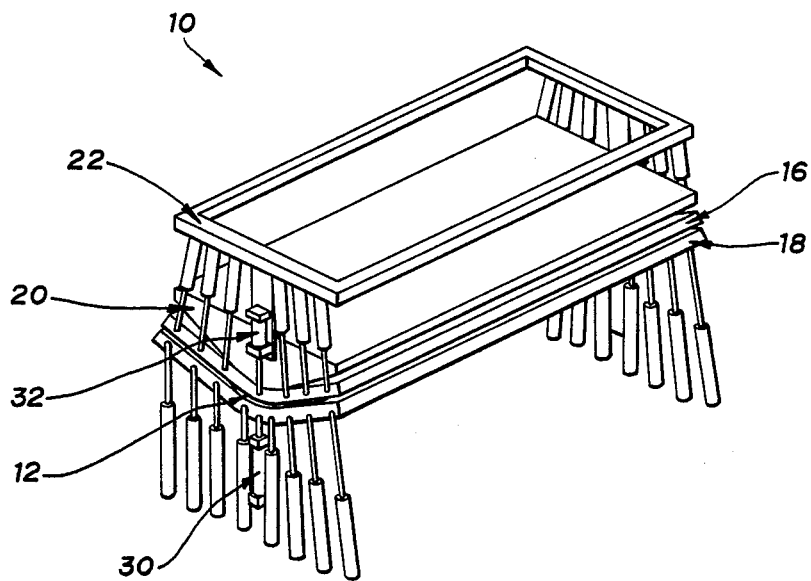
FIG. 3 is a perspective view of the apparatus illustrating a partially deformed lower platen bending the heated glass sheet with reference to a vertical guide and central actuator.

With reference to FIG. 3 of the drawings, the lower platen 18 is controllably deformed to form the desired bent shape in the glass sheet 12. As the lower platen 18 is deformed, the upper platen 16 follows the lower platen. Lower platen 18 can be deformed by raising portions of the lower platen, lowering portions of the lower platen, or by any combination of raising and lowering of portions of the lower platen. Preferably, deforming the lower platen is accomplished via programmed bending steps. Bending is performed with reference to a vertical guide 30 that guides vertical movement of the lower platen 18, and a central actuator 32, that controls vertical movement of the upper platen 16.

Figure 4:
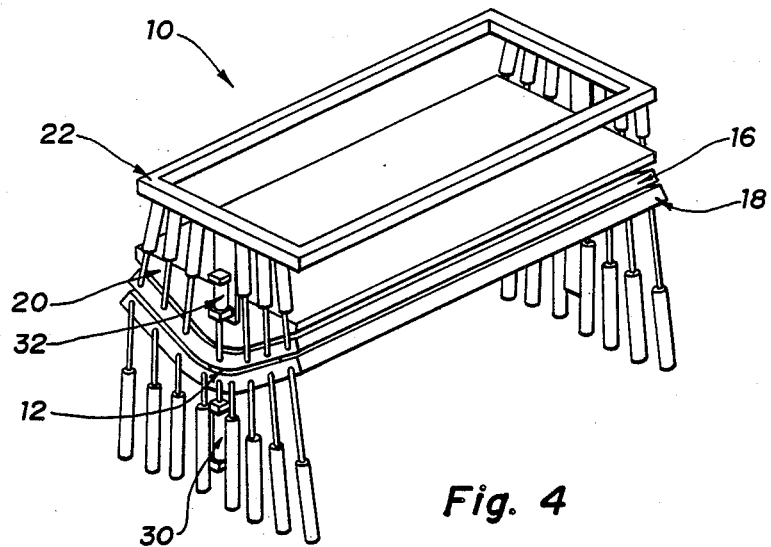
FIG. 4 is a perspective view of the apparatus illustrating the lower platen in raised position urging the glass sheet and upper platen up to or against a bending template imparting the desired bent shape and in position for quenching.

As show in FIG. 4 of the drawings, the bending is accomplished when the lower platen 18 has urged the upper platen 16 with heated glass sheet 12 therebetween upwardly near or against bending template 20. At this point, any heat being applied by the platens 16,18 to the glass sheet 12 is terminated and quench air is applied to the bent glass sheet through quench openings in the upper and lower platens in close proximity to both sides of the bent glass sheet.

Figure 5:
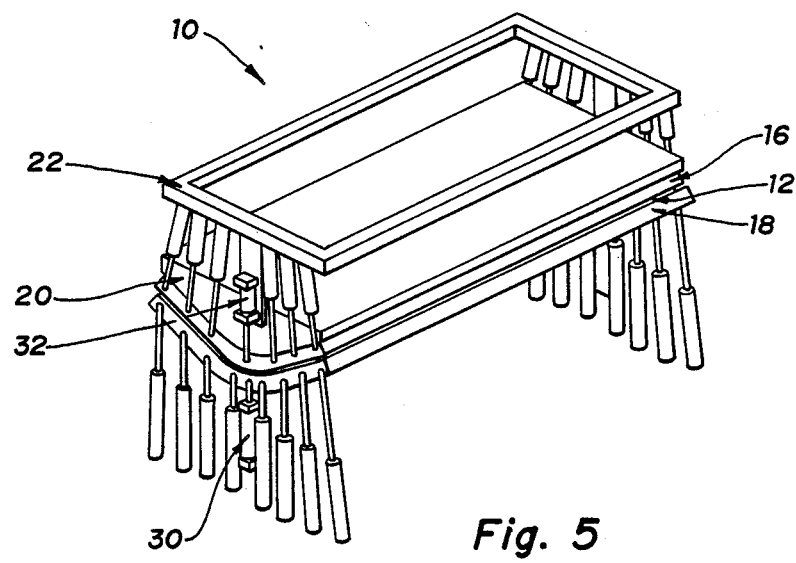
FIG. 5 is a perspective view of the apparatus illustrating the lower platen in its bent configuration and the upper platen being retained by its actuators against the template.

FIG. 5 illustrates the platens 16,18 prior to separating to disengage the upper platen 16 from the lower platen 18. This is accomplished by separating the upper and lower frame members 22,24 while maintaining the lower platen 18 in its deformed configuration and also retaining the upper platen 16 against template 20 as shown.

Figure 6:
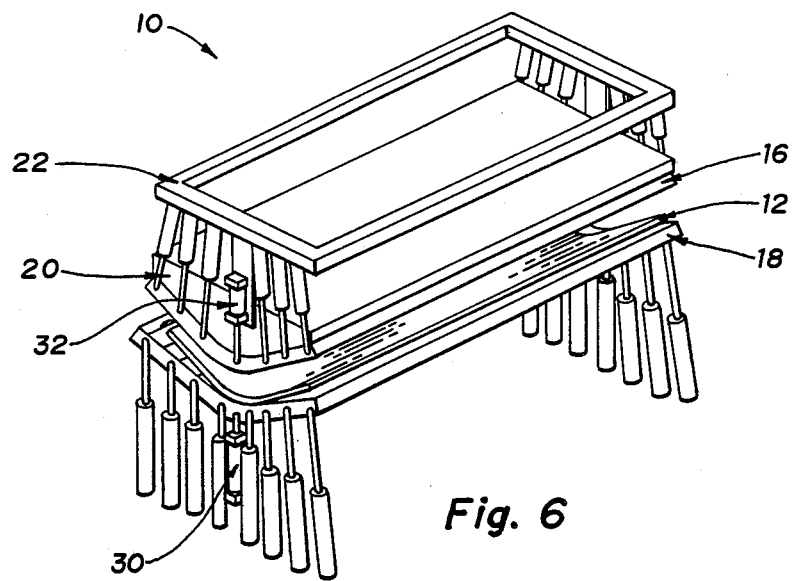
FIG. 6 is a perspective view of the apparatus illustrating raised and retained upper platen after the upper frame member has been raised with respect to the lower frame member.

With reference to FIG. 6, the upper frame member 22 and upper platen 16 are separated from the lower frame member 24 and lower platen 18 for subsequent removal of the bent glass sheet 12 from between the platens.

Figure 7:
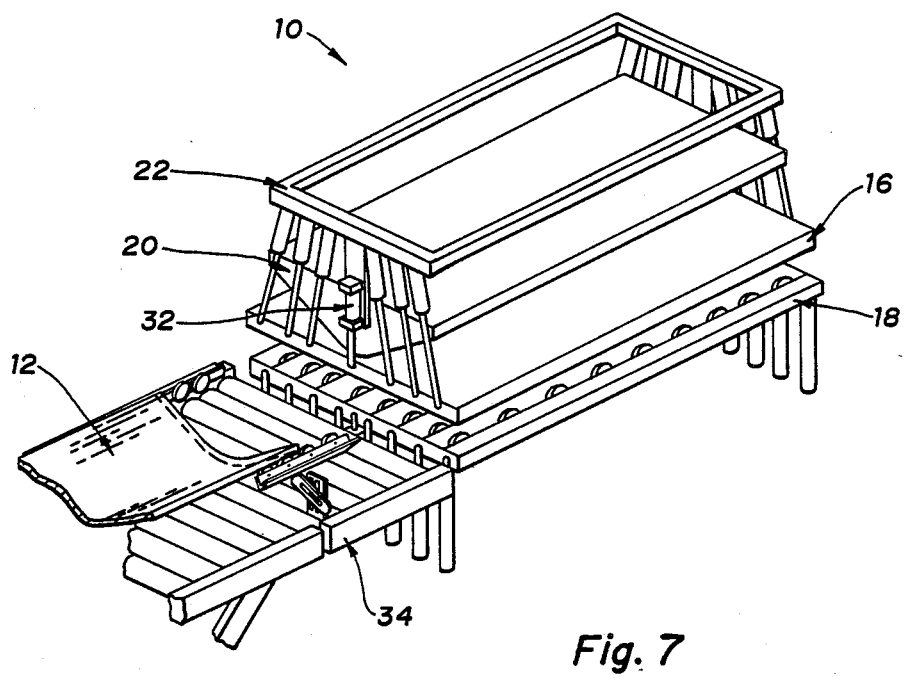
FIG. 7 is a perspective view of the apparatus illustrating the exited bent glass sheet on a run-out table and the upper platen in a planar upwardly retained configuration.

As illustrated in FIG. 7, the bent glass sheet 12 is exited out of the apparatus 10 and onto a runout table 34 for further processing. Upper platen 16 is returned to and maintained in a planar configuration after the bent glass sheet 12 is exited and apparatus is ready to be cycled again.

Glass sheet 12 also has been exited onto runout table 34 from the apparatus 10 and the bending process aborted if the temperature sensed by the sensor 28 was too low for subsequent processing. This would include a situation in which it would be inefficient under production conditions to add heat via the platens 16,18 to bring glass sheet 12 up to the optimal bending temperature.

While the best mode for carrying out the invention has been described in detail, those familiar with the art to which this invention relates will recognize various alternative embodiments for practicing the invention as defined by the following claims.

What is claimed is:

1. A method for bending and tempering glass sheets comprising: indexing a heated glass sheet between spaced upper and lower bending platens of a glass bending and tempering apparatus; bringing the upper platen in spaced relationship with the lower platen with the heated glass sheet therebetween and allowing the upper platen to move with the lower platen during bending; applying heat in close proximity to the heated glass sheet between the platens to maintain an optimal bending temperature; deforming the lower platen to form the desired bent shape in the glass sheet; terminating the heat applied by the platens to the glass sheet; quenching the bent glass sheet by applying quenching gas through quench openings in the upper and lower platens in close proximity to both sides of the bent glass sheet to temper the bent glass sheet between the platens; separating the platens to disengage the upper platen from the lower platen; and indexing the bent glass sheet out of the apparatus.

2. A method as in claim 1 wherein deforming the said lower platen is defined by raising portions of said lower platen.

3. A method as in claim 1 wherein deforming said lower platen is defined by lowering portions of said lower platen.

4. A method as in claim 1 wherein deforming said lower platen is defined by the combination of raising and lowering of said platen.

5. A method as in claim 1 wherein deforming said lower platen is accomplished via programmed bending steps.

6. A method as in claim 5 wherein said programmed bending steps create a substantially uniform bending rate throughout the glass sheet.

7. A method as in claim 1 further including the step of sensing temperature in the heated glass sheet.

8. A method as in claim 7 further including the step of exiting the heated glass sheet without bending if its temperature is too low.

9. A method as in claim 1 further including the step of regulating the heat applied to maintain the optimal bending temperature.

10. A method as in claim 1 further including the step of actuating the quench air.

11. A method as in claim 12 further including the step of terminating the quench air.

* * * * *